US007914684B2

(12) United States Patent
Suominen

(10) Patent No.: US 7,914,684 B2
(45) Date of Patent: Mar. 29, 2011

(54) METHOD AND APPARATUS FOR TREATING MIXED WASTE BY PYROLYSIS

(75) Inventor: Hannu L. Suominen, Helsinki (FI)

(73) Assignee: BCDE Group Waste Management Ltd Oy, Vantaa (FI)

( * ) Notice: Subject to any disclaimer, the term of this patent is extended or adjusted under 35 U.S.C. 154(b) by 1350 days.

(21) Appl. No.: 10/502,885

(22) PCT Filed: Jan. 29, 2003

(86) PCT No.: PCT/FI03/00070

§ 371 (c)(1), (2), (4) Date: Nov. 22, 2004

(87) PCT Pub. No.: WO03/064051

PCT Pub. Date: Aug. 7, 2003

(65) Prior Publication Data

US 2005/0074391 A1 Apr. 7, 2005

(30) Foreign Application Priority Data

Jan. 30, 2002 (FI) ..................................... 20020168

(51) Int. Cl.
*B01D 15/00* (2006.01)

(52) U.S. Cl. ........ 210/694; 210/705; 210/769; 210/774; 210/192; 210/202; 210/205; 422/184.1

(58) Field of Classification Search .............. 423/445 R; 210/694, 705, 769, 774, 192, 202, 205; 422/184.1; 209/12.1-12.2
See application file for complete search history.

(56) References Cited

U.S. PATENT DOCUMENTS

| | | | | |
|---|---|---|---|---|
| 3,741,890 | A * | 6/1973 | Smith et al. | 210/667 |
| 4,013,516 | A * | 3/1977 | Greenfield et al. | 201/2.5 |
| 4,198,004 | A * | 4/1980 | Albus et al. | 241/39 |
| 4,217,222 | A * | 8/1980 | Harendza-Harinxma | 210/177 |
| 4,385,731 | A | 5/1983 | Balistreri | |
| 4,505,435 | A | 3/1985 | Hellewell | |
| 4,647,443 | A * | 3/1987 | Apffel | 423/449.7 |
| 5,330,623 | A * | 7/1994 | Holland | 201/19 |
| 5,591,253 | A * | 1/1997 | Altman et al. | 96/61 |
| 5,725,738 | A * | 3/1998 | Brioni et al. | 201/14 |
| 5,888,359 | A * | 3/1999 | Suominen | 204/232 |
| 5,894,012 | A * | 4/1999 | Denison | 422/150 |
| 6,086,732 | A * | 7/2000 | Suominen | 204/232 |
| 6,244,198 | B1 * | 6/2001 | Suominen | 110/342 |

FOREIGN PATENT DOCUMENTS

| | | |
|---|---|---|
| DE | 4339158 A1 | 5/1996 |
| EP | 0144535 A2 | 6/1985 |
| EP | 0905213 | 3/1999 |
| WO | WO-0104235 | 1/2001 |
| WO | WO 0144405 A1 | 6/2001 |

* cited by examiner

*Primary Examiner* — Stanley S. Silverman
*Assistant Examiner* — Daniel C. McCracken
(74) *Attorney, Agent, or Firm* — Connolly Bove Lodge & Hutz LLP

(57) ABSTRACT

A method and apparatus for treating mixed waste by pyrolysis. Organic mass is carbonized by heating to carbon in a pyrolysis reactor (3) in an oxygen-free environment. Pyrolysis gases are distilled for oil and the gases are used for energy production. Solid matter resulting from pyrolysis is sieved for separating inorganic coarse particles from a carbon fraction. The carbon fraction is milled in two operations, first with a roller mill (8) and then with a jet mill (10), a removal of metal being performed between the operations. The pulverized carbon fraction is classified by means of ionizing particle separators (11, 12, 13). The multi-stage particle separation is followed by discharging clean air and recovering fine carbon.

10 Claims, 1 Drawing Sheet

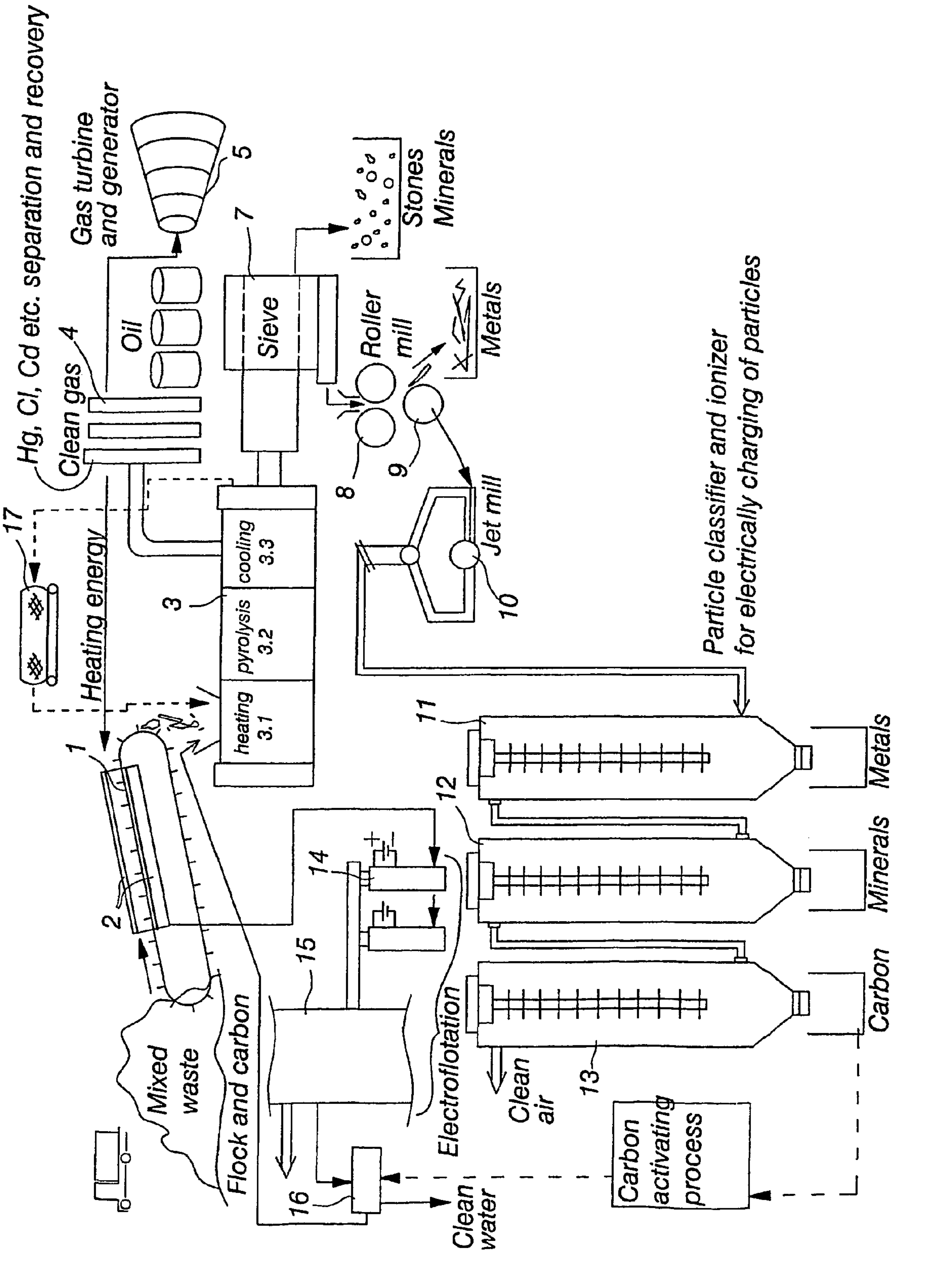
Hg, Cl, Cd etc. separation and recovery
Gas turbine and generator
5
Clean gas
4
Oil
7
Sieve
Stones
Minerals
Roller mill
Metals
8
9
Jet mill
10
Particle classifier and ionizer for electrically charging of particles
17
Heating energy
3
heating 3.1
pyrolysis 3.2
cooling 3.3
1
2
14
15
11
12
13
Metals
Minerals
Carbon
Mixed waste
Flock and carbon
Electroflotation
Clean air
Carbon activating process
16
Clean water

METHOD AND APPARATUS FOR TREATING MIXED WASTE BY PYROLYSIS

BACKGROUND

1. Technical Field

The invention relates to a method for treating mixed waste by pyrolysis, said method comprising carbonizing organic mass by heating in a pyrolysis reactor in an oxygen-free environment to carbon, distilling pyrolysis gases for oil and using the gases for energy production, screening solid matter produced in pyrolysis for separating inorganic coarse particles from a carbon fraction, and milling and classifying the carbon fraction.

The invention relates also to an apparatus for treating mixed waste by pyrolysis, said apparatus comprising a feed conveyor for mixed waste, a dewaterer, a reusable magazine carriage, a pyrolysis reactor, which is supplied with mixed waste by the conveyor and in which organic mass is heatable in an oxygen-free environment to carbon, an oil distillation column for distilling pyrolysis gases for oil while cleaning the gas, a sieve for screening solid matter resulting from the pyrolysis reactor for a fraction containing primarily carbon, and milling equipment for milling the carbon fraction, as well as a classifier and air cleaner for separating and recovering pure carbon.

2. Discussion of the Background

Patent publication U.S. Pat. No. 6,244,198 discloses a method and apparatus for the pyrolytic treatment of organic material. This prior known apparatus can be used also in the present invention as a pyrolysis reactor. Waste disposal methods and equipment, based on pyrolysis, are known in large numbers, notable examples including Patent publications U.S. Pat. No. 5,725,738 and EP-0905213. However, these prior art methods and equipment do not provide a sufficient solution for the after-treatment and grading of carbon produced in pyrolysis. However, this would be of paramount importance in terms of using recovered carbon and recycling the same for reutilization. Another unsolved problem with prior art pyrolysis reactors is the fact that the dewatering of waste to be fed into a pyrolysis reactor and the purification of water recovered therefrom have not been worked out with sufficient efficiency. The method and apparatus known from International Patent application WO 01/04235 are provided with preheating and dewatering of wastes, but there is no proposal for purification of water recovered therefrom.

SUMMARY OF THE DISCLOSURE

It is an object of the invention to provide a method and apparatus for substantially enhancing and improving the after-treatment and classification of recovered carbon, also in view of reutilization.

This object is achieved in the invention by a method as set forth in claim 1 and by an apparatus as set forth in claim 4. Preferred embodiments of the invention, especially the effective cleaning of water recovered from the dewatering of waste, are dealt with in the dependent claims.

DETAILED DESCRIPTION OF THE DISCLOSURE

The invention will now be described in more detail by way of example with reference to the accompanying drawing, which shows a general block diagram for a method and apparatus of the invention, visualizing various operations of a treatment process and equipment used therein.

Mixed waste is carried, e.g. from a pile of landfill, on a conveyor 1 into a magazine carriage 17, and thence on to a pyrolysis reactor 3. The reactor 3 may vary in many ways in terms of its design and operation. As one example, reference can be made to Patent publication U.S. Pat. No. 6,244,198. The reactor 3 has a first section 3.1 for heating the mass, a second section 3.2 for actual pyrolysis, and a third section 3.3 for cooling. Since the reactor 3 can be located far away from a waste dump, the delivery of wastes is performed by a mesh-covered magazine carriage 17 from the waste dump to a reactor 3 and further through the reactor 3. Regardless of design and operating mode, a common feature for all reactors 3 is the capability of heating organic mass to carbon in an oxygen-free environment. This carbonization by pyrolysis provides for a continuous generation of gas, which is delivered to an oil distillation column 4. The oil is recovered and the remaining gas is used for energy production, e.g. in a gas turbine and generator 5.

The solid matter resulting from pyrolysis is screened, e.g. with a rotary drum sieve 7, for separating inorganic coarse particles from a carbon fraction. The carbon fraction is milled or pulverized with a roller mill 8, and then with a jet mill 10, wherein the milling is based on colliding air-carbon jets. The milling operations are intervened by the removal of metals with a separator 9.

The milled or pulverized carbon fraction is classified by means of ionizing particle separators 11, 12, 13. These are used to perform a multi-stage particle separation, primarily for separating metal and mineral particles from carbon. The ionizing particle separators 11, 12, 13 are functionally based on ionizing airborne particles flowing through a chamber and collecting the charged particles by means of an electric field on live collector surfaces (e.g. chamber walls), the particles being recovered therefrom mechanically (e.g. with a vibrator) in a collector tray. What is essential is that sequential ionizing particle separators constitute a classifier, enabling a separate collection of metals and minerals and a recovery of fine carbon from the final separator, which has a degree of purity sufficiently high for the production of e.g. activated carbon. Thus, the activated carbon, resulting from a separate activated-carbon production process, can be used in a filter 16 for the ultimate cleaning of water recovered from the process, especially from the waste dewatering process. The impurities accumulated in carbon are removed and carbon is regenerated by feeding it through a dewatering operation back to the pyrolysis process. Clean air is delivered by the final separator 13 in the ion particle classifier.

In conjunction with the conveyor 1 lies a dewatering unit 2, the water obtained therefrom being carried through an iron-electrode fitted electrolytic cell 14. There may be more than one cells connected in parallel. The water, which has been treated electrolytically in the cell 14, and the flock, which consists of precipitate, are delivered to a flock separator 15 for separating flock from water, which latter, if desired, can be cleaned with an activated carbon filter 16 for service water. The water is sufficiently clean for returning to nature as soon as it has passed the flock separator 15. The purification achieved by a combination of the electrolytic cell 14 and the flock separator 15 through electroflotation has been described in more detail in the Applicant's Patent publications U.S. Pat. No. 5,888,359 and U.S. Pat. No. 6,086,732. The dewatering unit 2 may be operationally based e.g. on hot air injection for evaporating the water into an air flow, after which the water is condensed from the air. Thermal energy required for hot air injection can be produced by means of hot gases resulting from pyrolysis. The dewatering and water purification process is a completely closed process when dealing with a hazardous waste, which may contain e.g. prions.

The invention is capable of providing a zero emission pyrolysis for converting health-hazardous wastes to energy and reusable commodities.

The invention claimed is:

1. A method for treating mixed waste by pyrolysis, said method comprising carbonizing organic mass by heating in a pyrolysis reactor (3) in an oxygen-free environment to carbon, distilling pyrolysis gases for oil and using the gases for energy production, screening solid matter produced in pyrolysis for separating inorganic coarse particles from a carbon fraction, and milling and classifying the carbon fraction, wherein the a) milling is performed in two operations, first with a roller mill (8) and then with a jet mill (10), and a removal of metal is performed between the milling operations; and b) the milled carbon fraction is classified according to particle size/weight by means of ionizing particle separators for effecting a multi-stage particle separation, which is followed by discharging clean air and recovering pure carbon.

2. A method as set forth in claim 1, wherein waste is dewatered prior to pyrolysis and the water emanating from a dewatering unit (2) is cleaned with electroflotation, in which the water is guided through an iron-electrode fitted cell (14), and the resulting flock is then separated from water.

3. A method as set forth in claim 2, wherein the water purified with electroflotation is guided through an activated carbon filter (16) and activated carbon for the filter (16) is prepared from the end product of a method for treating mixed waste by pyrolysis, which comprises carbonizing organic mass by heating in a pyrolysis reactor (3) in an oxygen-free environment to carbon, distilling pyrolysis gases for oil and using the gases for energy production, screening solid matter produced in pyrolysis for separating inorganic coarse particles from a carbon fraction, and milling and classifying the carbon fraction, wherein the a) milling is performed in two operations, first with a roller mill (8) and then with a jet mill (10), and a removal of metal is performed between the milling operations; and b) the milled carbon fraction is classified according to particle size/weight by means of ionizing particle separators for effecting a multi-stage particle separation, which is followed by discharging clean air and recovering pure carbon as said end product;

and that the carbon used as a filter is returned to the pyrolysis process for cleaning.

4. An apparatus for treating mixed waste by pyrolysis, said apparatus comprising a conveyor (1) for mixed waste, a dewaterer (2), a magazine carriage (17), a pyrolysis reactor (3), which is supplied with mixed waste by the conveyor (3) and in which organic mass is heatable in a limited amount of oxygen to carbon, an oil distillation column (4) for distilling pyrolysis gases for oil and for cleaning the gas, a sieve (7) for screening solid matter resulting from the pyrolysis reactor (3) for a fraction containing primarily carbon, and milling equipment (8, 10) for milling the carbon fraction, wherein the milling equipment includes a roller mill (8) and a jet mill (10), and that from the jet mill (10) the carbon dust is guided through ionizing particle separators (11, 12, 13) for separating air to be discharged from fine carbon to be recovered.

5. An apparatus as set forth in claim 4, wherein the sequential ionizing particle separators (11, 12, 13) constitute a classifier for separating particles on the basis of specific gravity, weight and/or size.

6. An apparatus as set forth in claim 5, wherein the conveyor (1) is provided with a dewatering unit (2), from which water is guided through an iron-electrode fitted electrolytic cell (14) to a flock separator (15) for separating flock from water.

7. An apparatus as set forth in claim 6, wherein from the flock separator (15), water is guided through an activated carbon filter (16), and activated carbon for the filter (16) is made from the carbon which is recovered from a classifier constituted by a plurality of ionizing particle separators (11, 12, 13).

8. An apparatus as set forth in claim 4, wherein the conveyor (1) is provided with a dewatering unit (2), from which water is guided through an iron-electrode fitted electrolytic cell (14) to a flock separator (15) for separating flock from water.

9. An apparatus as set forth in claim 8, wherein from the flock separator (15), water is guided through an activated carbon filter (16), and activated carbon for the filter (16) is made from the carbon which is recovered from a classifier constituted by a plurality of ionizing particle separators (11, 12, 13).

10. An apparatus as set forth in claim 5, wherein from the flock separator (15), water is guided through an activated carbon filter (16), and activated carbon for the filter (16) is made from the carbon which is recovered from a classifier constituted by a plurality of ionizing particle separators (11, 12, 13).

* * * * *